Aug. 2, 1960

E. M. S. McWHIRTER 2,947,217

PHOTOGRAPHIC CONTROL APPARATUS

Filed May 12, 1955

INVENTOR.
E. M. S. McWHIRTER
BY
ATTORNEY

Aug. 2, 1960

E. M. S. McWHIRTER 2,947,217

PHOTOGRAPHIC CONTROL APPARATUS

Filed May 12, 1955

INVENTOR.

E. M. S. McWHIRTER

BY

E. D. Phinney

ATTORNEY

United States Patent Office 2,947,217
Patented Aug. 2, 1960

2,947,217

PHOTOGRAPHIC CONTROL APPARATUS

Eric Malcolm Swift McWhirter, Rye, N.Y., assignor to International Standard Electric Corporation, New York, N.Y., a corporation of Delaware Filed May 12, 1955, Ser. No. 507,834

8 Claims. (Cl. 88—24)

My invention relates to photographic control apparatus.

An object of my invention is the provision of a sequential filmed photographic record of variably indexed portions of documents or other media, by a photographic control apparatus which automatically adjusts a film framing mechanism associated with the camera, whereby only the indexed portions of the documents or other media are photographed on the film. A further object of my invention is to provide that the exposed frames, which are of varying vertical dimension depending upon the size of the undesired portions of the respective documents or media, are separated one from the next by a fixed small distance whereby an economy of film is effected.

According to my invention the document or other medium to be photographed has applied thereto an index defining the portion to be photographed and the camera has associated therewith an adjustable film framing means for varying a dimension of the image. A scanning device is arranged to scan the index on the document or medium and responsive thereto control the adjustment of the film framing means whereby only the indexed portion of the document, or other medium, is photographed.

The above and other objects and features will be clear from the following description and the accompanying drawings of one embodiment of the invention.

Figure 4A:
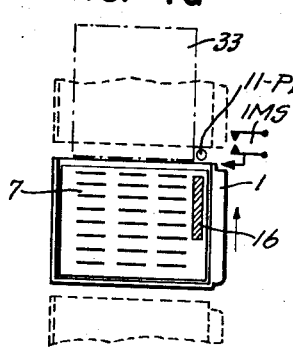

Figs. 4(a), (b) and (c) are enlarged views of a document and photo-area, an adjustable frame slide and a portion of an exposed film respectively, which will be referred to in the explanation of the operation of my invention.

Figure 1:
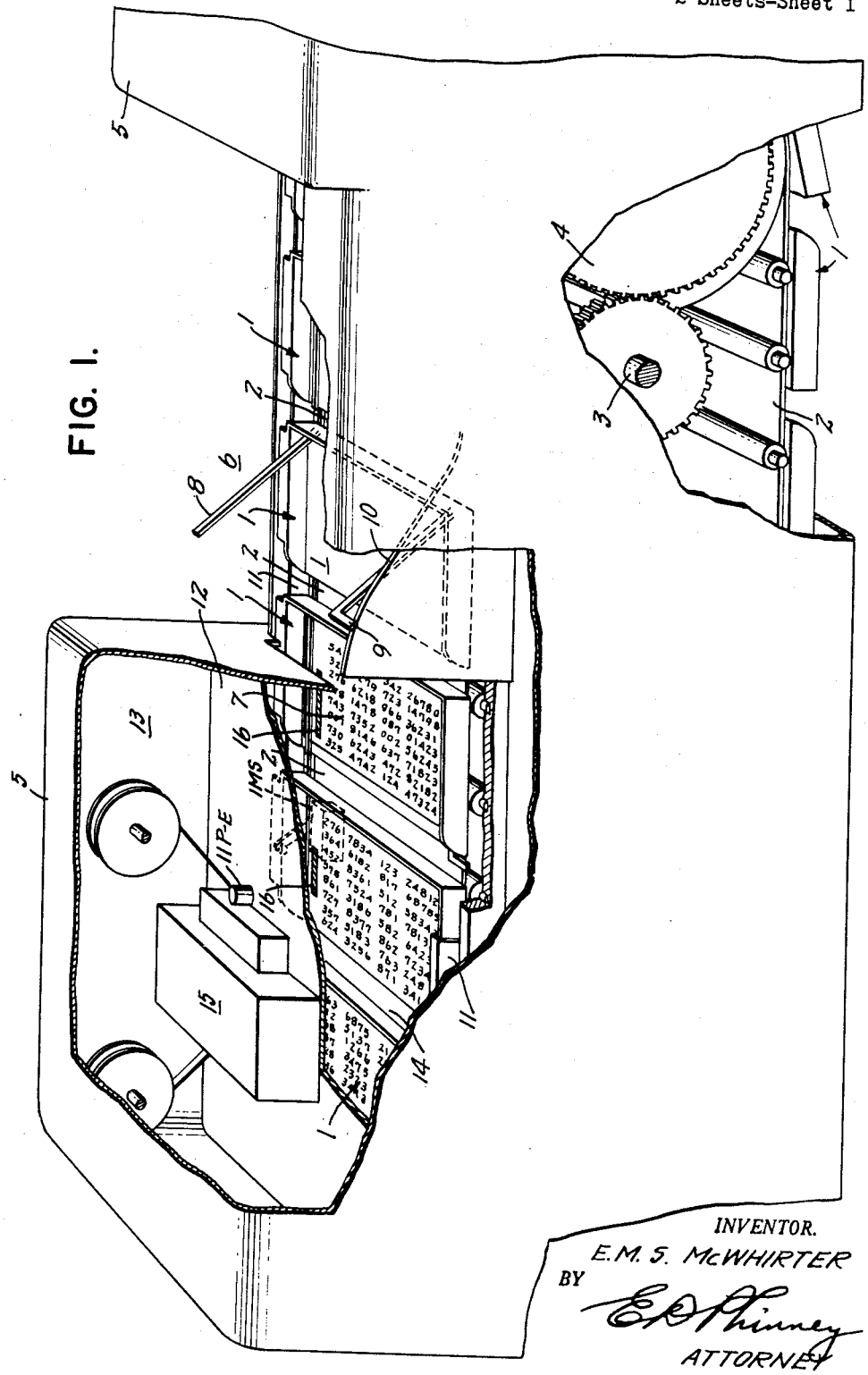
Fig. 1 shows the general mechanical arrangement of the apparatus.

Referring first to Fig. 1, document carriers 1 comprising shallow trays, are assembled on a continuous conveyor belt 2 driven by a motor-driven shaft 3 through a gearing 4 in known manner. The upper throw of the belt 2 emerges from the housing 5 and is exposed at an operator's position 6 whereat the documents, such as 7, to be photographed are inserted on the carriers 1. The carriers 1 are provided with spring-actuated clips 8 comprising spaced arms, one of which is formed with an extending finger 9, which, as the carrier approaches an entry slot in the left-hand portion of the housing 5 engages an inclined ramp 10 causing the clip 8 to be lifted away from the surface of the carrier 1. Documents are inserted on the carriers 1, either manually or automatically, as the carriers pass position 6 in which the clips 8 are lifted. Angle guides 11 disposed on opposite sides of housing 5 aid in positioning the carriers in transit.

The left hand portion of the housing 5 is divided by a horizontal partition 12 into two chambers 13 and 14. In the upper chamber 13 is mounted a camera, film drive, and automatic framing mechanism 15, the lens of the camera being projected through the partition 12. The carriers are transported between the guides 11 into the lower photographing chamber 14. A short distance before the photographing position is reached, there is mounted below one of the guides 11, a microswitch 1MS the contacts of which are adapted to be closed as a carrier 1 passes over it.

The documents or other media to be photographed are imprinted or inscribed with a vertical line, series of dots or other indices such as 16, located at a predetermined distance from one edge of the document. The line 16 is of such length and is so positioned relative to the data borne by the document, that it defines the vertical dimension of the portion of the document required to be photographed. The index line 16 is also sufficiently opaque to be detected by photo-electric means. Within the upper chamber 13 there is mounted above an aperture in the partition 12 a photo-electric cell 11PE. The cell 11PE is located above the path of the vertical index line 16 imprinted on the documents 7 and slightly in advance of the position of the micro-switch 1MS.

Figure 2:
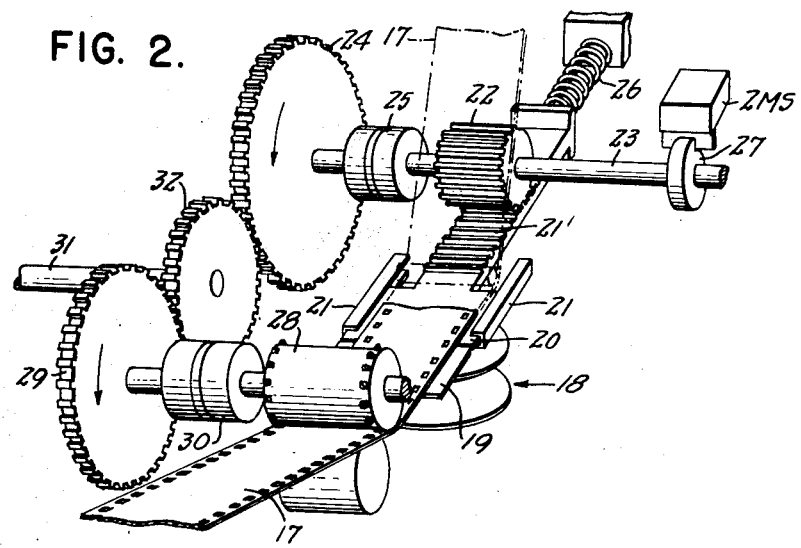
Fig. 2 shows the film drive and automatic framing mechanism.

Fig. 2 which illustrates the film drive and automatic framing mechanism in greater detail, will now be referred to. Between the film 17 and the camera lens and shutter assembly 18, or in some other suitable position, there is mounted an adjustable image framer comprising a stationary plate 19 and a movable plate 20 mounted to slide in guides 21. The area between the adjacent edges of the plates 19 and 20 define the vertical dimension of the image projected onto the film frame. A toothed rack 21' attached at one end to the movable plate 20, engages a half-pinion 22 mounted on a shaft 23 adapted to be coupled to a driving gear wheel 24 by a magnetic clutch 25. A compression spring 26 is provided to return the sliding plate 20 to its normally-closed position, when the teeth on the half-pinion 22 disengage the rack 21'. A cam 27 mounted on the shaft 23 is so shaped as to open in its normal position the contacts of a micro-switch 2MS: at this time the sliding plate 20 will also be in its normally-closed position.

The film 17 is arranged to be advanced by a film-feed mechanism 28, which is driven by a gear wheel 29 through a second magnetic clutch 30. The magnetic clutches 25 and 30 may be of any suitable known type.

The gear wheels 24 and 29 are driven by driving shaft 31 through an intermediate common pinion 32 so that the film 17 and the slide 20 of the image framer are moved at the same linear speed. The driving shaft 31 and the conveyor drive shaft 3 (Fig. 1) are rotated in synchronism so that the carriers 1 are advanced at a speed proportionate to the advance of the film 17 and frame slide 20.

Figure 3:
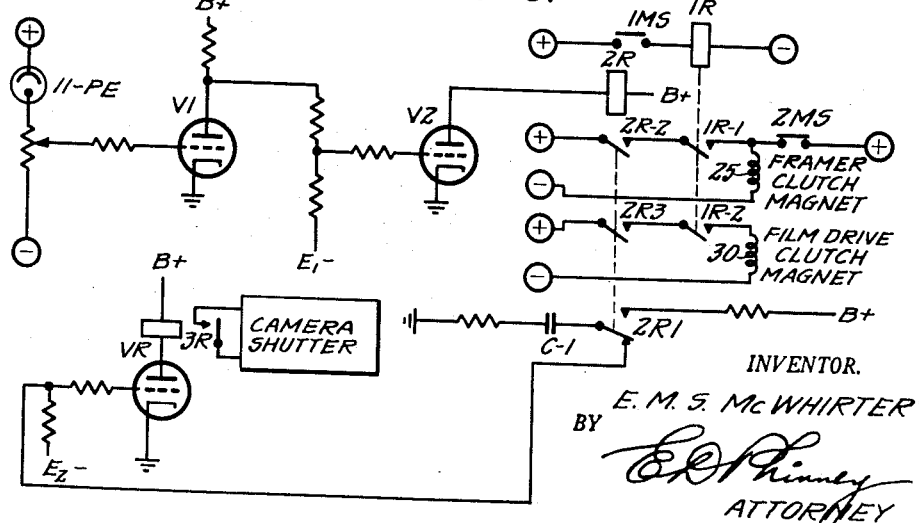
Fig. 3 is a circuit diagram illustrating the electrical control circuits.

The operation of the apparatus will now be described with reference to Figs. 3 and 4 in conjunction with Figs. 1 and 2.

When a carrier 1 enters the photographing chamber 14, Fig. 1, and before arriving in the photo area of the camera, microswitch 1MS is closed by the carrier previously described and energizes a relay 1R, Fig. 5, which at contacts 1R1 and 1R2 prepares circuits for the film drive clutch magnet 30 and the framer clutch magnet 25.

As soon as the beginning of the opaque strip 16 passes under the photo-cell 11PE the positive bias on the grid of a triode tube V1 is reduced thereby reducing the plate current and raising the plate voltage. Since the plate of tube V1 is resistance-coupled to the grid of a tube V2, tube V2 will now conduct, and operate a relay 2R. Relay 2R at contacts 2R2 and 2R3 completes the circuits of clutch magnets 30 and 25, and at contacts 2R1 causes a condenser C1 to charge to the B voltage. The shaft 23 and the film feed 28 are now coupled to the driving shaft 31 through the clutches 30 and 25 and the gear train 24, 29, 32, and the film 17 and slide 20 are moved at the same speed.

Since the slide 20 and film 17 are moved at the same linear speed and the carrier 1 and its document 7 at a proportionate speed relate to the size of the camera photo area, as the carrier 1 advances, an edge of the frame slide 20 is separated from the adjacent edge of the fixed framer plate 19 by an increasing distance proportional to that vertical dimension of the document which has been scanned by the photo-cell 11PE.

When the photo-cell 11PE detects the end of the opaque line 16 on the document 7, relay 2R restores, opening at contacts 2R2 and 2R3 the operating circuits of clutch magnets 25 and 30. The film drive is thereby stopped, and at contacts 2R1 of relay 2R positive potential is applied to the grid of a tube V3 from the condenser C1, causing tube V3 to conduct and actuate a relay 3R. Relay 3R actuates mechanism to trip the camera shutter in any known manner. It will be noted that at this time only that portion of the document 7 indexed by the line 16 has been photographed and only a portion of the film proportionate to the indexed part of the document has been exposed by the framer slide 20.

When the frame slide shaft 23 started rotation, the cam 27 caused the actuation of the microswitch 2MS which closed an alternative holding circuit for the frame clutch magnet 25 independent of contacts 2R2 and 1R1 of relays 2R and 1R. The drive of shaft 23 is thus continued until the half gear 22 disengaged the framer slide rack 21' which returns the slide 20 to its closed position under the action of the compression spring 26. When the slide 20 is returned to its normal position and the cam 27 has made a full rotation to normal the contacts for microswitch 2MS open and the clutch magnet 25 is now de-energized. After the charge on C1 is dissipated, tube V3 no longer conducts and relay 3R is released. The document carrier 1 having passed through the photographing area, releases the microswitch 1MS, causing relay 1R to restore. The next document carrier on the conveyor is now advanced into the photo chamber 14 and the cycle is repeated.

Figure 4B:
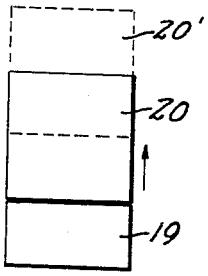
Figure 4C:
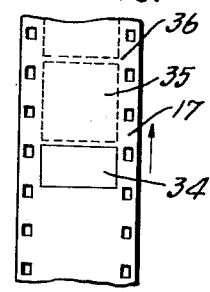

Fig. 4(a) shows a document 7 in a carrier 1 just about to enter the photo area 33, preparatory to the carrier 1 actuating the microswitch 1MS. Fig. 4(b) is an enlarged view of the image framer in normal closed position (full lines) with the edges of fixed frame plate 19 and the sliding plate 20 abutting. The position of the sliding plate just as the opaque strip 16 leaves the field covered by the photo-cell 11PE is shown at 20' in dotted lines. Fig. 4(c) is an enlarged view of a section of the film 17, the frame 34 representing the picture of the part of the document 7 and the frame 35 that of the portion of the preceding document which has been photographed. It will be readily appreciated that the vertical dimension of each frame on the film corresponds to the heighth of the index line, such as 16, on the respective document, and that each frame is separated by a small fixed unexposed strip 36, the height of which may be determined by selection of relays 2R and 3R having suitable characteristics.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. Control apparatus for photographing data recorded on a document, comprising a camera, adjustable image framing means for said camera to select a desired portion of the document for photographing, index means applied to said document and coextensive in length with said desired portion of the document for indicating the said portion to be photographed, means producing relative movement between said camera and said document, photoelectric means mounted in a position to scan said index means and effective during said relative movement to produce a control signal for controlling said framing means, said index means controlling the amount of light impinging on said photoelectric means, and means responding to said control signal to vary a dimension of said image framing means as determined by said index means to cause said camera to photograph only that portion of the document determined by the said length of said index means.

2. Control apparatus for photographing data recorded on a document, comprising a camera, image framing means for said camera to select a desired portion of the document for photographing, said framing means including a fixed framing member and a movable framing member which members together define said selected portion to be photographed, light controlling index means applied to said document and coextensive in length with a dimension of said desired portion to be photographed, means to produce relative movement between said camera and said document, photoelectric means mounted in a position to scan said index means and effective during said relative movement to produce a control signal for controlling said movable framing member, said index means controlling the amount of light impinging on said photo-electric means, and means responding to said control signal for moving said movable framing member to vary a dimension of said image framing means with respect to said index means to cause said camera to photograph only that portion of the document determined by a dimension of said index means.

3. Control apparatus for photographing data recorded on a medium comprising a camera, film advancing means for said camera, adjustable image framing means associated with said camera for varying a dimension of the image, a linear index applied to said medium so as to define a dimension of that part of the medium required to be photographed, means for producing relative movement between said camera and said medium, means for actuating said film advancing means so that said film is advanced at a speed proportionate to the speed of said relative movement between said camera and said medium, scanning means for scanning said linear index at a speed proportionate to the speed of advance of said film, means responsive to said scanning means for controlling said adjustable image framing means, a shutter for said camera, and means effective under control of said scanning means to operate said shutter when said index is moved out of the field of said scanning means.

4. Control apparatus for photographing data recorded on documents comprising a camera, film advancing means for said camera, image framing means for said camera comprising a fixed frame member and a movable frame member which together define the vertical dimension of the image, indices applied to said documents for defining the vertical dimension of the parts of the documents to be photographed, a photographing position, means for sequentially advancing said documents into said position, scanning means associated with said position for scanning said indices, means for actuating said film advancing means to advance the film synchronously with the relative movement between said scanning means and a document to be photographed, means responsive to said scanning means for adjusting said movable frame member synchronously with the relative movement between said scanning means and said document to define together with said fixed frame member a vertical dimension of the image, a shutter for said camera, and means effective under control of said scanning means to operate said shutter when said index is moved out of the field of said scanning means.

5. Control apparatus for photographing data recorded on documents comprising a camera, film advancing means for said camera, movable image framing means for said camera for defining a vertical dimension of the image on the film of said camera, linear indices applied to said documents for defining the vertical dimension of the parts of the documents required to be photographed, a photographing chamber, means for successively transporting said documents into said chamber, scanning means in said chamber for scanning said linear indices, means for actuating said film advancing means to advance the film at a speed proportionate to the speed at which the documents are advanced into said chamber and past said scanning means, means responsive to said scanning means for adjusting said movable image framing means so that the vertical dimension of the image is increased proportionately as said linear index of a document transported into said chamber is scanned by said scanning means, a shutter for said camera and means responsive to said scanning means for actuating said shutter.

6. Control apparatus for photographing data according to claim 5, in which said means for transporting said documents comprise a carrier for each document and a conveyor for said carriers and further comprising first driving means for said conveyor, second driving means, first clutch means for coupling said second driving means with said film advancing means, second clutch means for coupling said second driving means with said means for adjusting said movable image framing means and means responsive to said scanning means for controlling said first and second clutch means.

7. Control apparatus for photographing data according to claim 5, in which said indices comprise imprinted opaque lines located along the edges of the documents and said scanning means comprising a photo-electric cell mounted within said chamber in such a position that it is adapted to scan said opaque lines as said documents are advanced in said chamber.

8. Control apparatus for photographing data according to claim 5, in which said movable image framing means comprising a sliding member adapted to define said vertical dimension, a toothed rack for moving said sliding member, a driving shaft, a pinion toothed over a portion of its periphery mounted on said shaft and meshing with said rack, a spring for returning said rack to a normal position, electric clutch means controlled by said scanning means for coupling said shaft to said pinion, a switch, a holding circuit for said clutch means controlled by said switch, and a cam mounted on said shaft in operable relation to said switch and so shaped as to actuate said switch and open said holding circuit in its normal position.

References Cited in the file of this patent

UNITED STATES PATENTS

| | | |
|---|---|---|
| 2,207,266 | Ogden | July 9, 1940 |
| 2,415,424 | Gaebel | Feb. 11, 1947 |
| 2,621,560 | Steinhardt | Dec. 16, 1952 |
| 2,748,651 | Simjian | June 5, 1956 |